United States Patent [19]

Haganuma et al.

[11] Patent Number: 4,774,590
[45] Date of Patent: Sep. 27, 1988

[54] FACSIMILE APPARATUS

[75] Inventors: Tomoyuki Haganuma, Yokohama; Takashi Takeda, Murayama; Yukihiko Ogata, Kawasaki; Yoji Kaneko, Machida; Kosuke Kunishi, Tokyo; Yoshio Yoshiura, Kanagawa, all of Japan

[73] Assignee: Canon Kabushiki Kaisha, Tokyo, Japan

[21] Appl. No.: 854,586

[22] Filed: Apr. 22, 1986

[30] Foreign Application Priority Data

Apr. 24, 1985 [JP] Japan .................................. 60-87784
Apr. 24, 1985 [JP] Japan .................................. 60-87785
Apr. 24, 1985 [JP] Japan .................................. 60-87786
Apr. 24, 1985 [JP] Japan .................................. 60-87787

[51] Int. Cl.$^4$ ............................................ H04N 1/40
[52] U.S. Cl. ..................................... 358/280; 358/286
[58] Field of Search ................ 358/280, 256, 286, 261

[56] References Cited

U.S. PATENT DOCUMENTS 4,563,706 1/1986 Nagashima .......................... 358/257
4,604,653 8/1986 Shimizu ................................ 358/257

FOREIGN PATENT DOCUMENTS 117871 9/1984 European Pat. Off. .
3414622 10/1984 Fed. Rep. of Germany .

Primary Examiner—Edward L. Coles, Sr.
Attorney, Agent, or Firm—Fitzpatrick, Cella, Harper & Scinto

[57] ABSTRACT

A facsimile apparatus has a CCU for receiving image data, a decoder for decoding received data, an image memory for storing the decoded data, a CPU for controlling send/receive operation, and a printer for printing received data. High-speed data communication can be performed using a small-capacity memory and a digital transmission line and without data loss.

9 Claims, 13 Drawing Sheets

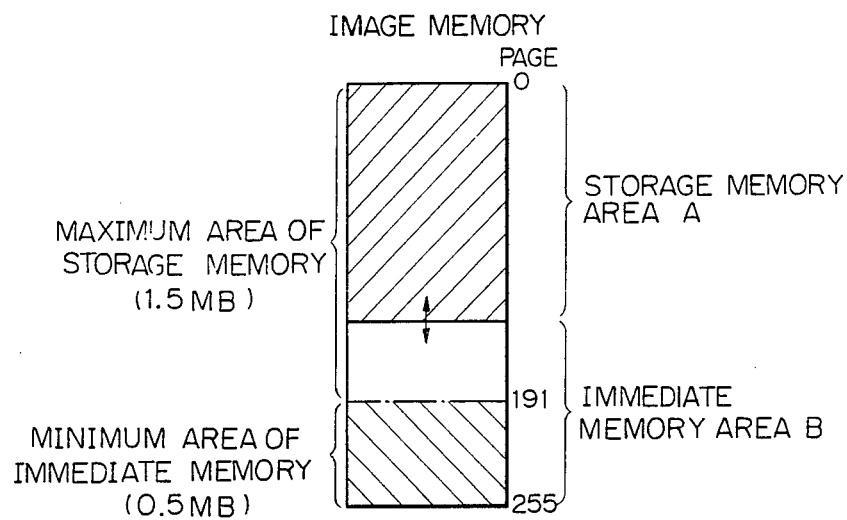
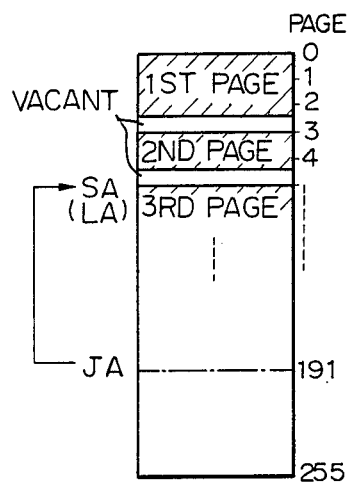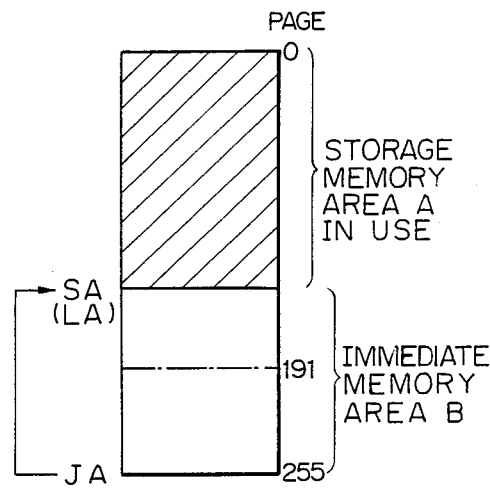

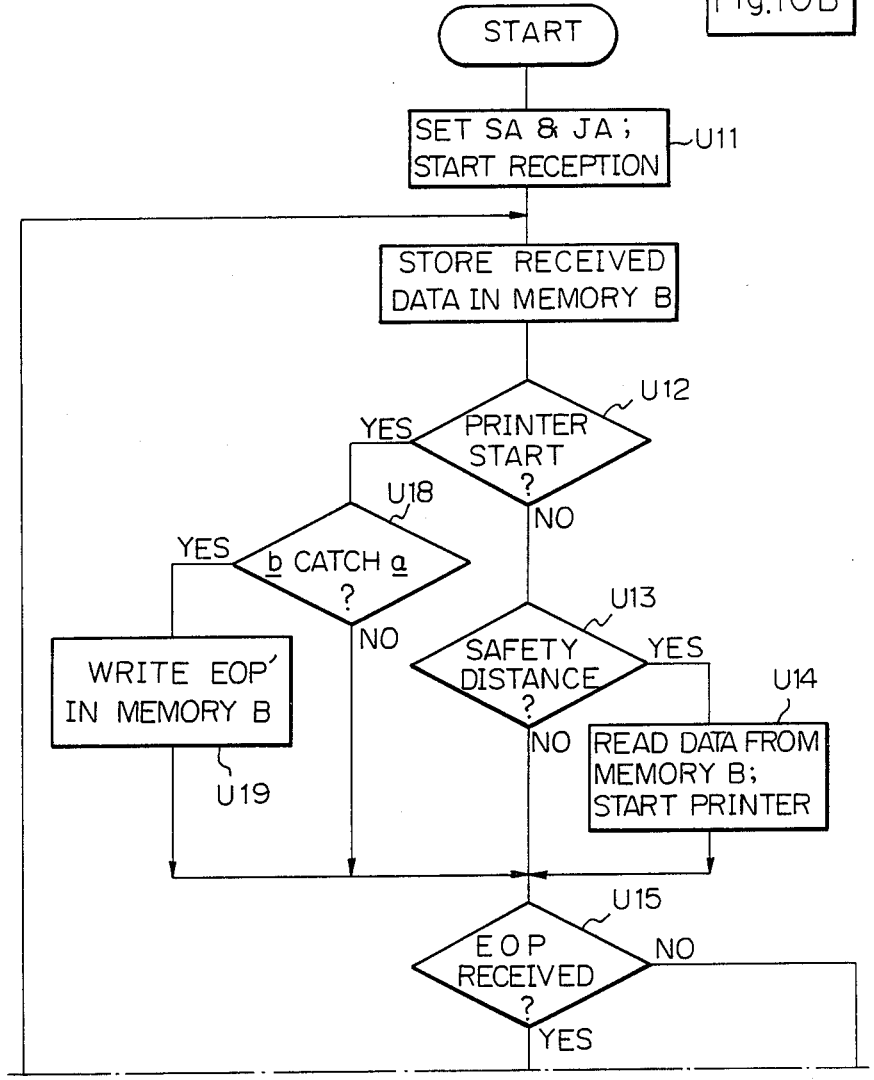

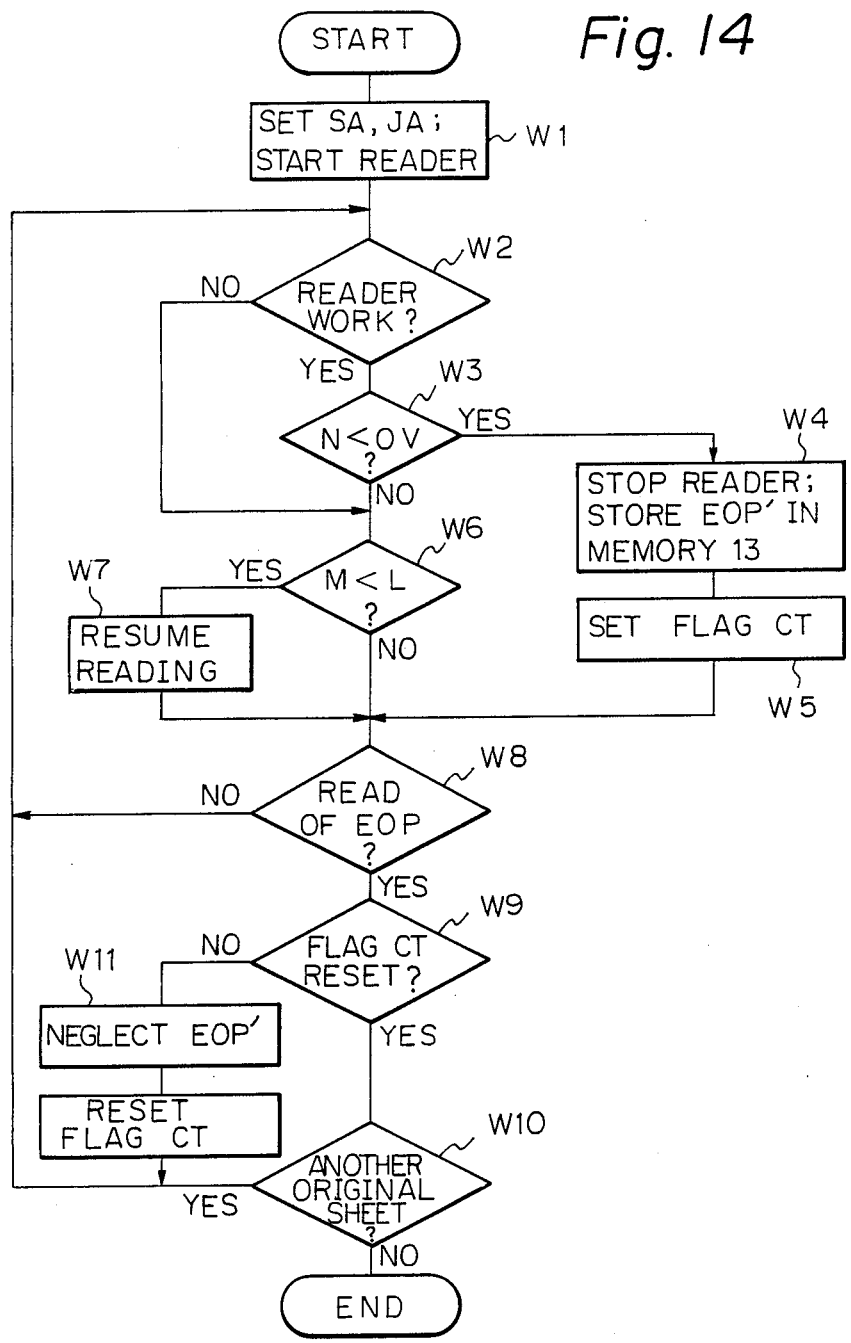

FACSIMILE APPARATUS

BACKGROUND OF THE INVENTION

1. Field of the Invention

The present invention relates to an image data processing apparatus, such as a facsimile apparatus.

2. Related Background Art

In data transmission or reception, some conventional facsimile apparatuses temporarily store a "send" or "received" signal (code data of sending or received information) in a memory. Upon reception of sent data, all the received data must be stored in the memory and must then be read out to start printing the data. This is because the data sent through a line should not be temporarily interrupted by the reception side, in the interest of effective circuit utilization. However, if the reception data is long or the number of pages of the original is large, the time prior to printing is prolonged.

When original data is long and a plurality of pages are sent to a reception side with a limited memory capacity, convenient sending or reception of the data cannot be performed.

Multiprinting can be performed using a facsimile memory. However, if the memory capacity is limited, printing errors tend to occur.

A scheme has recently been proposed for sending high-quality original information through a digital data line at high speed, in place of a telephone line. However, even if high-quality original information can be sent to a reception side, a conventional printer such as a thermal printer may not be compatible with the high speed and quality thereof, and much cannot be expected from it.

SUMMARY OF THE INVENTION

It is an object of the present invention to provide a facsimile apparatus which eliminates the above drawbacks.

It is another object of the present invention to provide an image processing apparatus for immediately outputting an image signal upon reception of data.

It is still another object of the present invention to improve a facsimile system using a memory.

It is still another object of the present invention to provide an image processing apparatus having a memory of a small capacity, which can be used as if it is a memory of a large capacity.

It is still another object of the present invention to provide an image transmission apparatus for sending/receiving original information without impairing effective circuit utilization or omitting a part thereof, even if the number of pages of the original information is large.

It is still another object of the present invention to provide a facsimile apparatus having a printer suitable for a high-speed digital transmission line.

The above and other objects, features, and advantages of the present invention will be apparent from the following detailed description in conjunction with the accompanying drawings.

BRIEF DESCRIPTION OF THE DRAWINGS

FIG. 6 is a format showing a memory space of an image memory;

FIG. 7 is a view for explaining a storage memory area of the image memory;

FIG. 9 is a view for explaining an immediate memory area of the image memory;

FIG. 14 is a flow chart for explaining the memory read-write control when data is sent using the immediate memory area.

DETAILED DESCRIPTION OF THE PREFERRED EMBODIMENT

Figure 1:
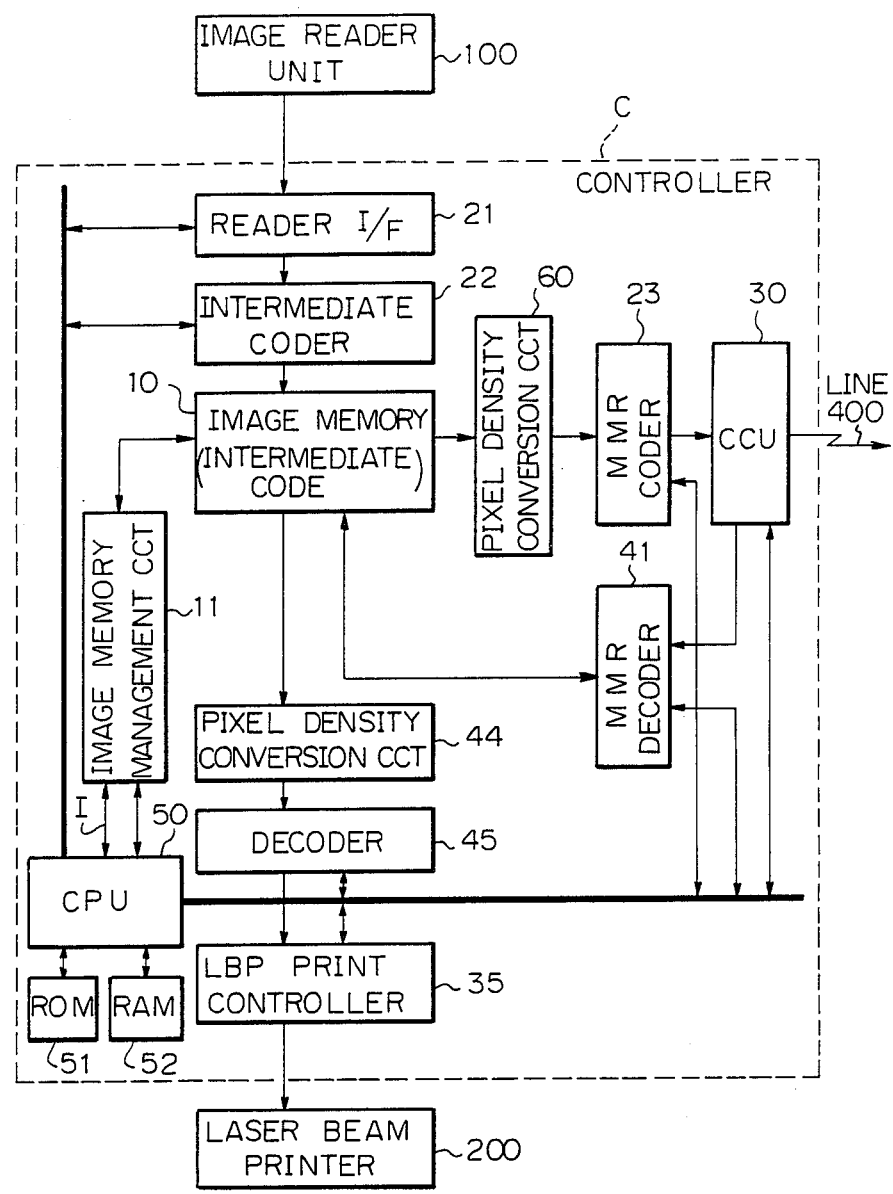
FIG. 1 is a block diagram showing an embodiment of the present invention.

FIG. 1 is a block diagram showing an embodiment of the present invention.

This embodiment exemplifies a facsimile apparatus having an image reader unit 100, a laser printer 200 as a recording system, a digital data switching (DDX) line 400, and a controller C for controlling the reader unit 100 and the laser printer 200 and for managing data exchange with the DDX line 400.

Figure 2:
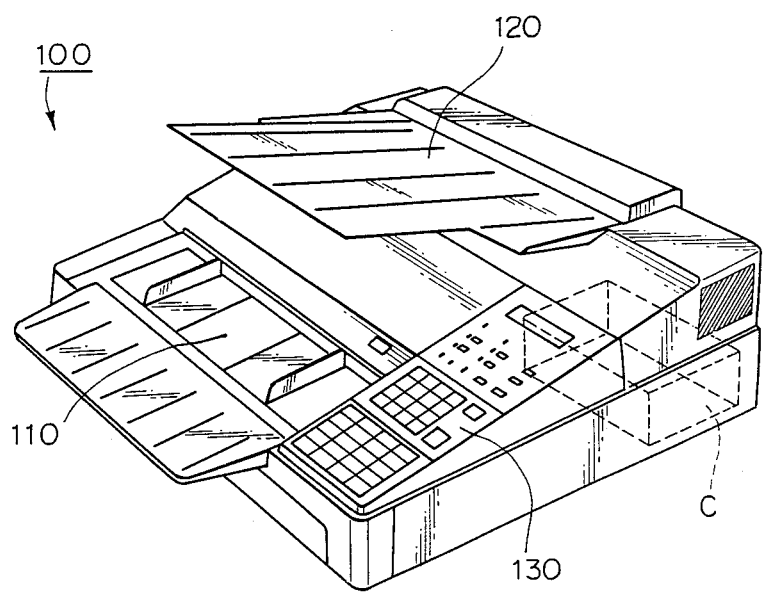
FIG. 2 is a perspective view showing a sample of an image reader unit.

FIG. 2 is a perspective view showing the image reader unit 100.

A predetermined original is inserted in the original insertion section 110. Image information is converted to an electrical signal by an image reading means arranged inside the unit 100. The original is exhausted from a paper ejection tray 120. An operation panel 130 is arranged in the image reader unit 100. The controller C is incorporated in the unit 100 to control the image reader unit 100 and the laser beam printer 200.

Figure 3:
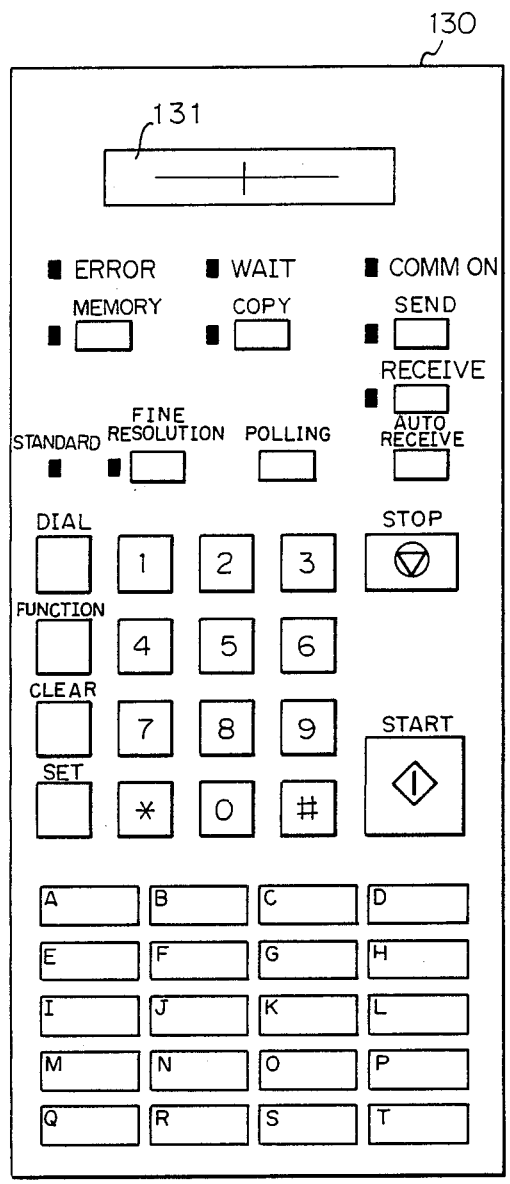
FIG. 3 is a plan view showing a sample of an operation panel.

FIG. 3 shows the operation panel 130. At the operation panel 130, an operator designates the use of a storage memory area, selection of a standard resolution or fine resolution mode, a minifax mode (NTT mode), a send mode (such as a halftone mode), a destination dialling, selection of a copy, send, or receive mode, and other functions. When an image memory (to be described later) is used as a storage memory area, the operator depresses "memory" key shown in FIG. 3.

Figure 4:
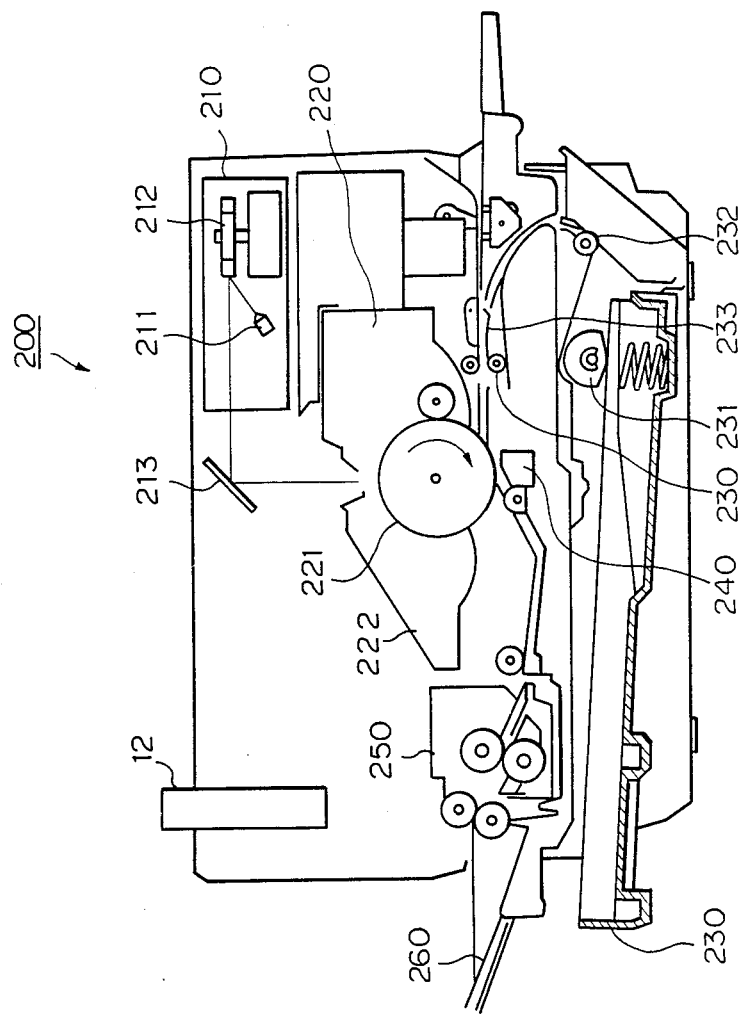
FIG. 4 is a longitudinal sectional view showing a sample of a laser printer.

FIG. 4 is a longitudinal sectional view of the laser beam printer 200.

The laser beam printer 200 includes an exposure unit 210, a developing unit 220, a paper cassette 230, a transfer unit 240, a fixing unit 250, and a stacker unit 260. The exposure unit 210 comprises a laser unit and a scanner. The laser unit includes a laser 211, which is modulated by image data from the controller C. The scanner includes a polygonal mirror 212.

The developing unit 220 comprises a photosensitive drum 221 and a cleaner 222, and visualizes a latent image formed by a reflecting mirror 213 on the drum 221.

Sheets in the paper cassette 230 are fed by a pickup roller 231 and a feed roller 232 one by one. Each sheet is temporarily stopped at a registration shutter 233. Laser emission and rotation of the drum 221 are synchronized with the paper feed, and the sheet is then fed by supply rollers 234. A toner image is transferred onto the sheet by the trnasfer unit 240, and is fixed on the sheet by the fixing section 250.

Timing control of a series of operations such as the paper feed, character formation, development, transfer, and fixing is performed through a laser beam printer controller 35 on the basis of read timings of data stored in an image memory 10. A 4-size sheet printing can be completed within about 4 to 6 seconds of data reception.

Referring back to FIG. 1, the controller C will now be described.

The controller C comprises a transmission system for sending data read from the image reader unit 100 to a receiving end or destined end, the image memory 10 for storing predetermined image data, and a CPU 50 for controlling the overall operation of the controller C. The memory 10 can store data of about 2 Mbytes.

The transmission system comprises a reader interface 21, an intermediate coder 22 for converting the read data to an intermediate code, the image memory 10 for storing the intermediate code, a pixel density conversion circuit 60 for decreasing a pixel density, an MMR coder 23 for further coding the intermediate code, and a CCU 30 for assembling (i.e., packeting) the MMR code. The intermediate code is a mixture of a known run-length code and uncoded image data. When the number of word bits is larger than that of continuous bits of the original image data upon run-length coding, the original data is not coded. The intermediate code can be effectively used to perform density conversion (8 pel/mm or 16 pel/mm) according to the density of a receiving end and code conversion (MH or MMR) according to a reception mode (G3, G4, etc.) of the receiving end when data is to be sent. The CCU 30 packages the MMR-converted data together with additional data such as a label in units of 128 bytes, and sends the resultant data packet onto the DDX line 400, which has a bit rate of 64 kbps.

The reception system comprises the CCU 30 for depacketing the sent data packet, an MMR decoder 41 for converting the received data to an intermediate code, the image memory 10 for storing the intermediate code as an output signal from the MMR decoder 41, a pixel density converting circuit 44 having a dot multiplying means, a decoder 45 for converting the intermediate code to a video signal, and the laser printer controller 35 for modulating and controlling the laser beam printer 200.

An image memory management circuit 11 controls and manages the overall operation, such as a remaining memory capacity storage and read and write operations of the image memory 10. The image memory management circuit 11 includes an address counter for controlling addressing of the memory 10.

The CPU 50 controls the overall operation of the controller C, and its control program (to be explained later with reference to a flow chart) is stored in a ROM 51. Data required for executing the program is stored in a RAM 52.

In the send mode, the image memory 10 sends the storage data at the 64-kbps bit rate of the DDX line 400 (packet or circuit switching network), i.e., at a rate not slower than that of the transmission line. In the receive mode, the image memory 10 stores data of one page and sends the one-page data to the decoder 45 at a rate which is compatible with the 3-Mbps printing rate of the printer 200. When the image memory 10 is used as a retention memory, the data is retained until multicopying is completed. However, when the image memory 10 is used as a multi-address send memory, the data is held until multi-address calling is completed.

In the send mode, when the data is read out from the memory 10, it is encoded by the MMR coder 23. In this case, the memory 10 is accessed at a rate slightly higher than the 64-kbps bit rate. In the receive mode, when the data is sent from the memory 10 to the printer 200, it is decoded by the decoder 45. In this case, the memory 10 is accessed at a rate slightly lower than the 3-Mbps printing rate. In the send and copy modes, the memory 10 is write accessed at substantially the same rate as the 3-Mbps read rate of the reader unit 100. In the receive mode, the data is written in the memory 10 at substantially the same rate as the 64-kbps rate of the DDX line 400.

The operation of the above embodiment will now be described.

Figure 5A:
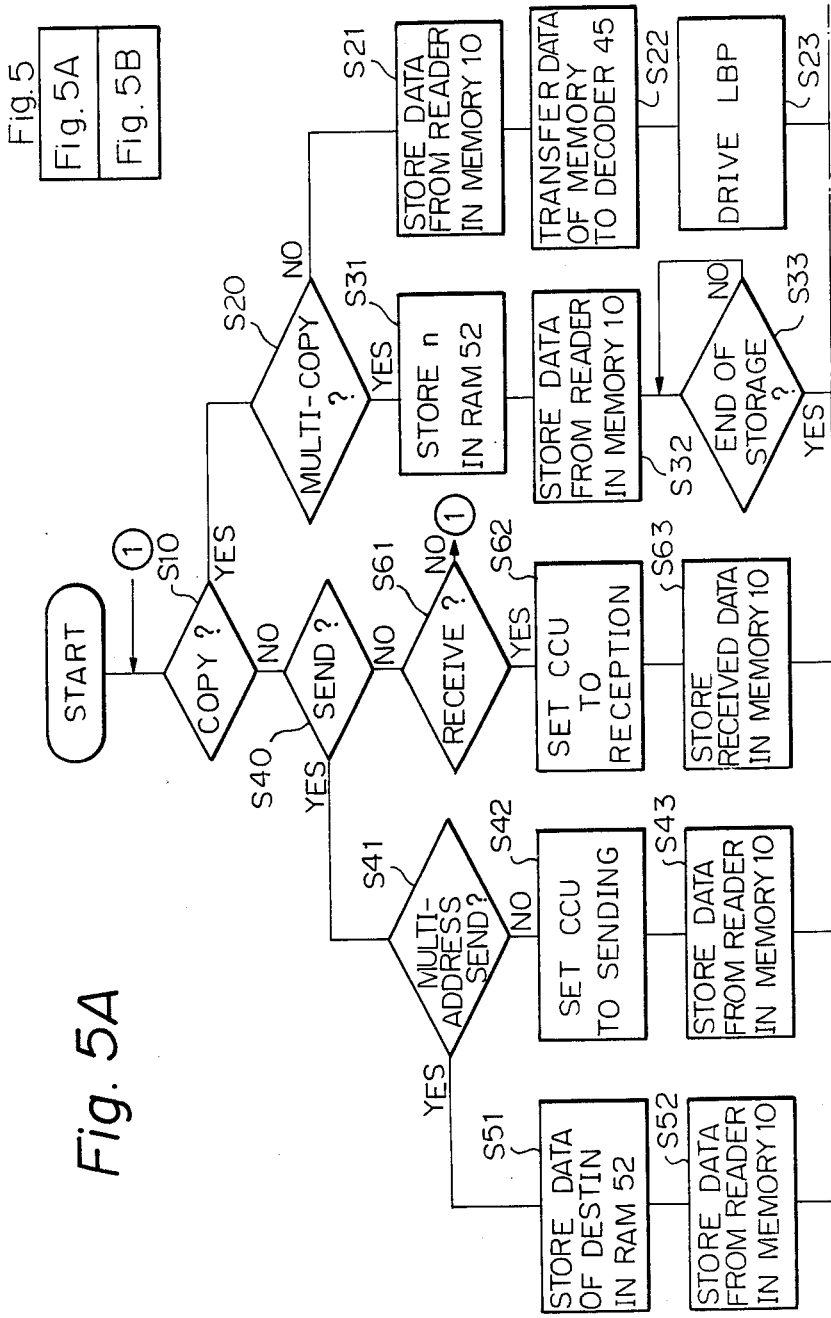
FIG. 5, consisting of FIGS. 5A and 5B, is a flow chart for explaining the generation sequence of the embodiment.
Figure 5B:
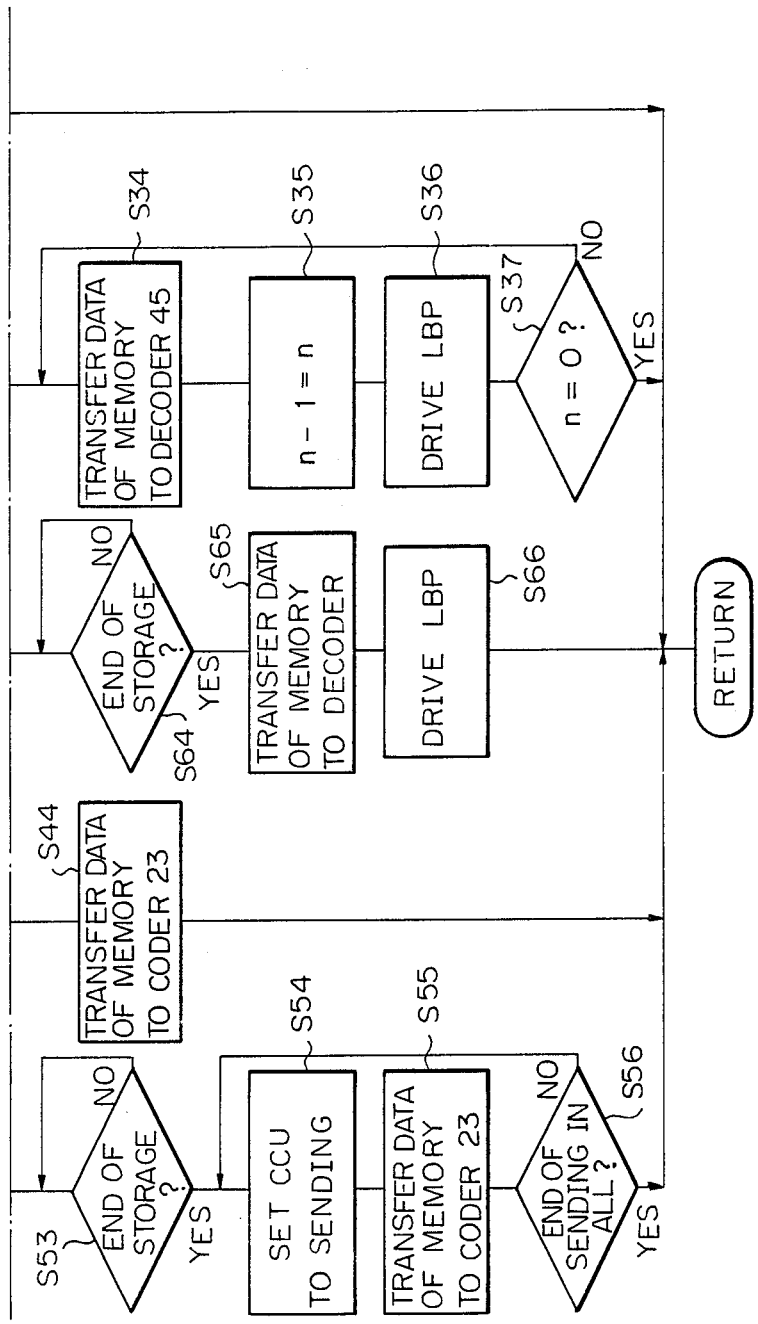

FIG. 5 is a flow chart showing the control operation of the embodiment.

The CPU 50 checks if the start button and the copy key are depressed (S10), and if the multicopy mode is set according to a value set by a ten-key pad for inputting the number of copies (S20). In the single copy mode, the CPU 50 drives the image reader unit 100 and the intermediate coder 22 through the reader interface 21, and converts the read data from the image reader unit 100 to an intermediate code. The address counter in the memory management circuit 11 is operated to stored the intermediate code in the image memory 10 (S21). The intermediate code is converted to a video signal (image data) by the decoder 45 (S22). The laser printer 200 is driven in response to the video signal (S23). In this case, the image memory 10 serves as a buffer for storing data of a few lines. In other words, memory read access is started before one-page data storage is completed, thus performing real-time copying.

In the multicopy mode, a repeat number n is set in the RAM 52 (S31). After the data from the reader unit 100 is converted to the intermediate code, it is stored in the image memory 10 (S32). Thereafter, the CPU 50 checks if the data of one-page is stored in the image memory 10 (S33). The CPU 50 determined the storage of one page by counting pulses (EOL or End of Line signal), generated for each-line reading for one page, from the reader interface 21, by detecting an EOP (End of Page) signal generated upon completion of the original scanning of one page, or by detecting the end of one-page storage in response to the management data from the management circuit 11. In the same manner as in step S22, the memory data (the intermediate code) is converted to the video signal by the decoder 45 (S34). The repeat number n is decremented by one (S35) and the laser beam printer 200 is driven (S36). This operation is repeated by n times (S37).

If the copy key is kept off, the CPU 50 determined if the send key is depressed (S40). If YES in step S40, the CPU 50 checks if the multi-address send key is depressed (S41).

If YES in step S41, the destination data input at the ten-key pad is stored in the RAM 52 (S51). By depressing a key for the end of destination data input, the data from the reader unit 100 is converted to the intermediate code, which is then stored in the image memory 10 (S52). When one-page data storage is completed and checked for by the CPU 50 (S53), the CCU 30 is set for a first destination (S54). The data read out from the image memory 10 is converted to an MMR code by the MMR coder 23 (S55), which is then sent onto the DDX line 400. The above sequence is repeated for all destinations (S56). In this case, whenever one-page data is sent, the destination data is cleared from the RAM 52 one by one. When the CPU 50 determines that all the destination data is cleared, multi-address sending is completed.

For a single sending destination, the CCU 30 is set in the send mode (S42). The read data is set in the image memory 10 (S43), coded by the coder 23 (S44), and sent onto the DDX line 400.

For data reception (S61), the CCU 30 is set in the receive mode (S62). The received data is converted to the intermediate code by the MMR decoder 41 and the intermediate code is stored in the image memory 10 (S63). When a maximum of one-page data is stored (S64), the intermediate code from the image memory 10 is converted to the video signal by the decoder 45 (S65). The laser printer 200 is driven in response to the video signal (S66). It should be noted that the end of storage is determined upon detection of a received EOP signal.

The basic recording resolution of the laser printer 200 is 16 pixels/mm ×15.4 lines/mm. When the data is received from a normal facsimile system with a resolution of 8 pixels/mm ×7.7 lines/mm (S61 to S65), the dots are overwritten by the pixel density conversion circuit 60. More specifically, the received data is repeated a predetermined number of times (e.g., once) for each dot, and the resultant data is sent to the decoder 45. The resultant data is also repeated a predetermined number of times (e.g., once or twice) for each line, and the resultant data is sent to the decoder 45. Therefore, even if the high-density laser printer 200 is used, the image size is not decreased upon printing of the reception data. This is applicable when other normal high-speed paper printers, such as thermal transfer printers, are used. However, the pixel density conversion circuit 60 need not be used. The image memory 10 may be read accessed through the image memory management circuit 11 so as to obtain the same result under the control of the CPU 50.

FIG. 6 shows a memory space of the image memory 10.

The image memory 10 is a single memory which consists of a storage memory area A and an immediate memory area B. The storage memory area A stores the image date of a predetermined intermediate code, and is cleared after sending or after a predetermined period of time (e.g., 24 hours) passes. The predetermined intermediate code includes image data for memory sending, memory copy, polling waiting, time designation sending, time designation delivery, and immediate delivery. In the storage memory area A, the page address is incremented for each additional page.

Overflow storage is allowed in the memory. Such method is utilized that the stored data corresponding to a page which is overflowing is invalidated. After data of a plurality of pages is stored, they are sent together or collectively.

The immediate memory area B aims at immediate reception, and is based on a FIFO (First-In First-Out) function for allowing simultaneous reading and writing of the predetermined intermediate code. The intermediate code includes copy data, send data, and receive data, all of which correspond to the image. When the immediate memory area is used, the image reader is controlled in the send mode, and the printer is controlled in the receive mode, thereby preventing overflow. One page or plural pages of the original information can be continuously and in all sent or printed in the send or receive mode. The storage memory area A is changeable and the remaining area thereof can be used as the immediate memory area B. Since a minimum area is assured for the immediate memory area, the minimum area cannot be used as the storage memory area A.

The maximum storage memory area A is 1.5 Mbytes and so on and the minimum immediate memory area B is 0.5 Mbyte and so on, A total of 2 Mbytes are divided into page addresses for pages 0 to 155. The maximum storage memory area A starts on page 0 and ends on page 191. The maximum immediate memory area B starts on page 0 and ends on page 255, and the minimum immediate memory area B starts on page 199 and ends on page 255. It should be noted that the ratio of the storage memory area A to the immediate memory area B can be arbitrarily set.

In a state where data of a predetermined image is stored in the storage memory area A, an incoming transmission is to be allowed to be stored in area B.

Figure 8:
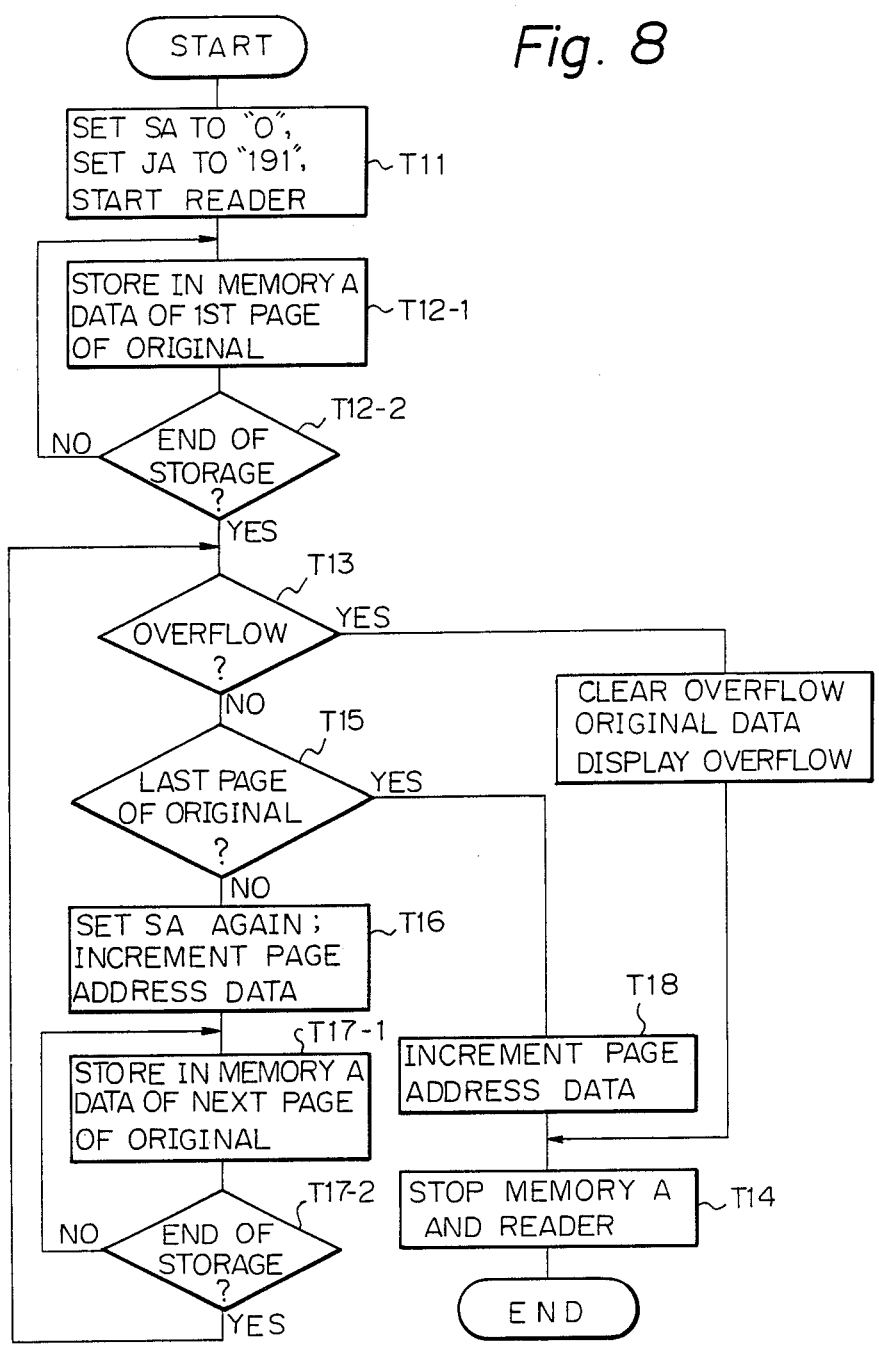
FIG. 8 is a flow chart for explaining the control sequence when the storage memory area is used.

FIG. 7 is a view for explaining the storage memory area A, and FIG. 8 is a flow chart for explaining the operation when the storage memory area A is used. The operation is started by the memory key in FIG. 3.

When the storage memory area A is used to perform time designation sending, time designation delivery, immediate delivery, or polling waiting, the following operation must be performed.

In the memory write mode, a write start page address SA is set to "0" and a jump address JA for returning to the address SA is set to "191". The reader unit 100 is started (T11) and the intermediate code data for the first page is stored (T12-1 and T12-2). The reason why the jump address JA is set to "191" lies in the fact that the last page of the storage memory area A is page 191.

When the storage memory area A overflows, the management circuit 11 supplies an interrupt signal to the CPU 50 (T13). The memory 10 stops storing the data and, at this time, the reader unit 100 stops reading the image data (T14). However, if overflow does not occur, the CPU 50 checks if the currently read page of the original is the last page (T15). If YES in step T15, the page address data is incremented to form a blank (T18), and memory storage and reader scanning are stopped (T14). The determination in step T13 is performed by checking whether the address is updated from the jump address JA to the address SA. The determination in step T15 is performed by checking if a subsequent page of the original is present.

If NO in step T15, the write start page address SA is set again, and the page address is incremented (T16). In the case of FIG. 7, the first page of the original ends at the intermediate portion of the second page of the page address. The start address SA is updated to 3 (page address 3). The jump address JA need not be updated.

When the intermediate code data of the second page of the original is stored (T17-1 and T17-2), the start address SA is set again (T16). In the case of FIG. 7, the second page of the original ends at the intermediate portion of the fourth page of the page address. The address SA is updated to 5 (page address 5). The jump address JA need not be updated.

The above operation is repeated. When the intermediate code data corresponding to the last page of the original is completed, the page address is incremented in the same manner as described above. The current start address SA is given as the first page of the immediate memory area B. If the volume of original information of the third page is large and the data storage is not completed upon storage up to the jump address JA, the address returns to address 5 as the start address SA, thus detecting memory overflow. Memory storage and reader scanning are interrupted and the original data of the third page is neither available nor accessed. However, the original data of the first and second pages is retained and can be accessed. In this case, the overflow state and the number of retained pages are displayed on the display 131 in FIG. 3.

It should be noted that data EOP is added to the end of one-page data when it is stored in the memory 10.

In order to read out the data from the memory area A, the data signals of the plurality of pages are sequentially read out from page address 0 (except for the overflow page) at a rate slightly smaller than the transmission line rate. This readout operation is controlled by the management circuit 11 in accordance with the data representing the number of pages.

Figure 10B:
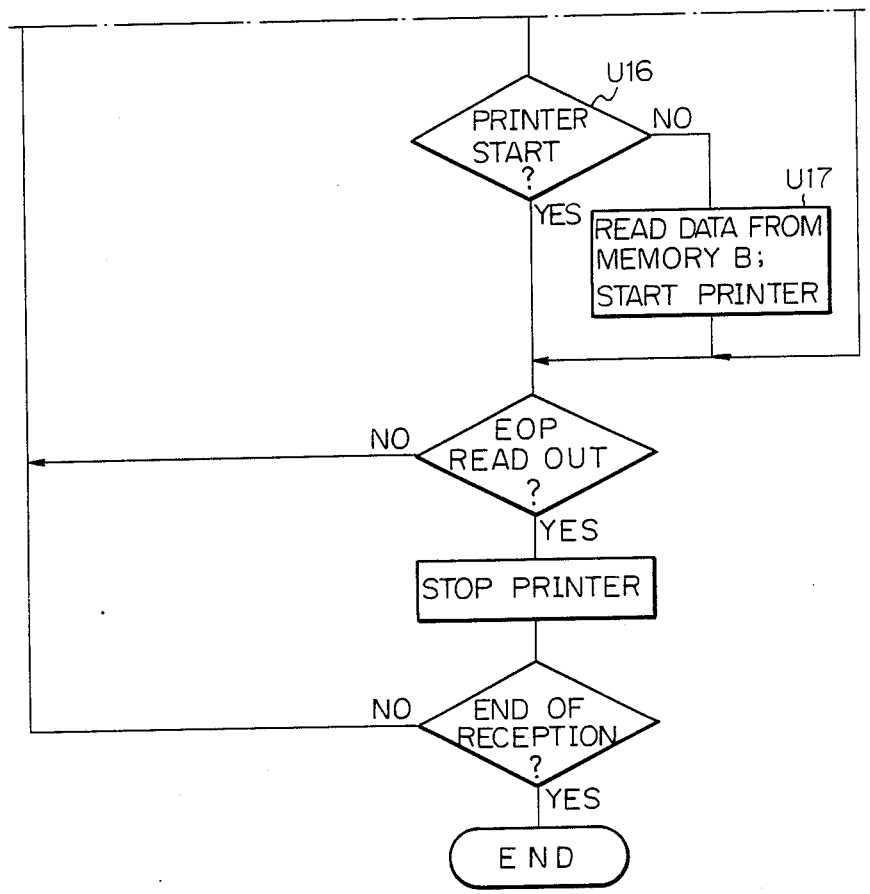
FIG. 10, consisting of FIGS. 10A and 10B, is a flow chart for explaining memory read-write control when sent data is written in the immediate memory area.

FIG. 9 is a view for explaining the immediate memory area B, and FIG. 10 is a flow chart for explaining the operation when the immediate memory area B is used.

Reception from the DDX line 400 will be exemplified below.

The memory write/read start address SA is set to the start page of the immediate memory area B, the jump address JA is set to be 255, and the CCU 30 is controlled to start reception (U11).

The intermediate code data is written in the immediate memory area from the start address SA and is read out therefrom under the following conditions. The received code data is decoded by the decoder 45, and the laser printer 200, as a page printer, prints the image (U12).

Figure 11:
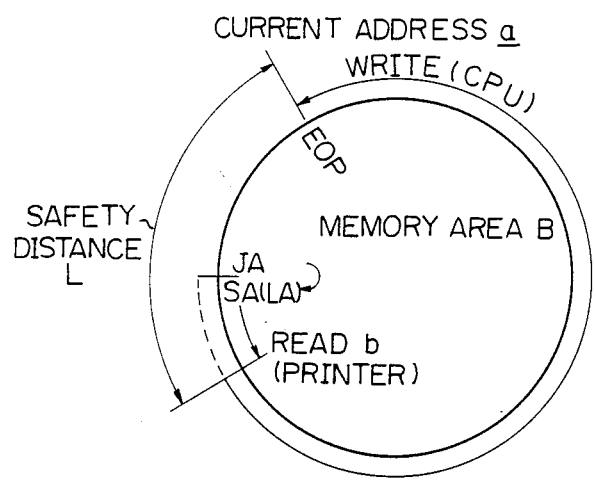
FIGS. 11 and 12 are views for explaining read-write control of the immediate memory area.

In this case, a memory write safety distance is checked. When the CPU 50 determines that the distance reaches a safety distance L (U13), a data address from the memory area at the address SA is read out, and the printer 200 is started (U14). As shown in FIG. 11, the safety distance L is the distance from the current write address a of the image memory 10 to the address of the data initially stored in the page (the address a is to be printed on this page), that is, the address SA of the data initially stored in the first page to be printed or the currently read-accessed address b. The safety distance L is an address distance for allowing reception data writing while the printer 200 is being operated or is stopped. As long as the data write operation continues to exceed the safety distance L, the data may overlap the storage data. Since the data is read out and the printer 200 is started after the current distance reaches the safety distance L, the time from data reception and the start of printing can be shortened. The safety distance L can be determined by checking the address data a and b. The CPU 50 checks if the EOP (End of Page) representing the end of one page of the original is received for each line (U15). If NO in step U15, the above operations (i.e., memory write, safety distance determination, and EOP detection) are repeated. If the EOP is received, the CPU 50 checks if the printer 200 is being operated (U16). If NO in step U16, the printer 200 is started, and the storage data prior to reception of the EOP is read out and printed (U17). Therefore, when first page storage is completed and second page storage is started, first page printing can be started, thereby shortening a waiting time.

Figure 12:
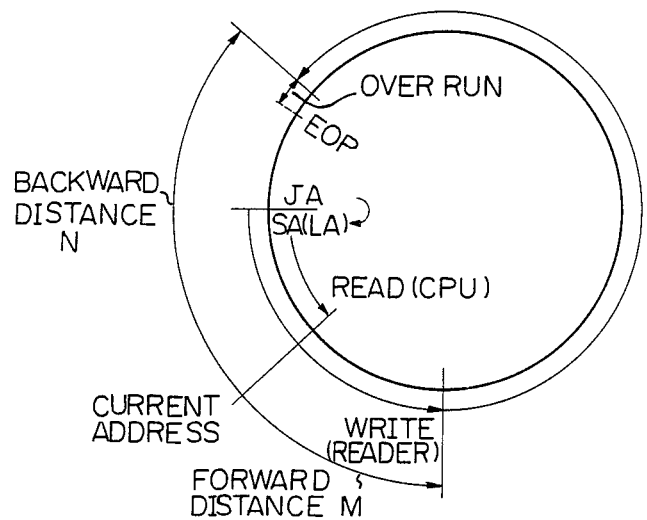

During memory storage and operation of the printer 200, when reading is performed as shown in FIG. 12 such that the current address b in the image memory 10 is equal or almost equal to the write address a (a forward distance M is determined as needed) (U18), a pseudo-EOP' is written at the end of the line of the memory area B (U19). When the pseudo-EOP' is generated, the memory read is temporarily interrupted and the printer 200 is stopped. The printer 200 is thus ready for the next printing operation. The memory 10 subsequently continues to store the reception data. When the current distance reaches the safety distance L or the EOP is detected, the printer is started again. More specifically, the reception image is divided and output, thereby preventing the printed data from being read out and printed again. It should be noted that another paper sheet is used for printing after such interruption.

When the immediate memory area B receives the reception signals or reader output signals, the number of which is the same as he memory capacity, the write address jumps to the jump address JA. When additional reception signals are then received, writing is restarted from the start address SA. The code is then overwritten in the immediate memory area B. In other words, the previous data is erased. When the write address reaches the jump address JA, an interrupt signal I is generated.

Figure 13:
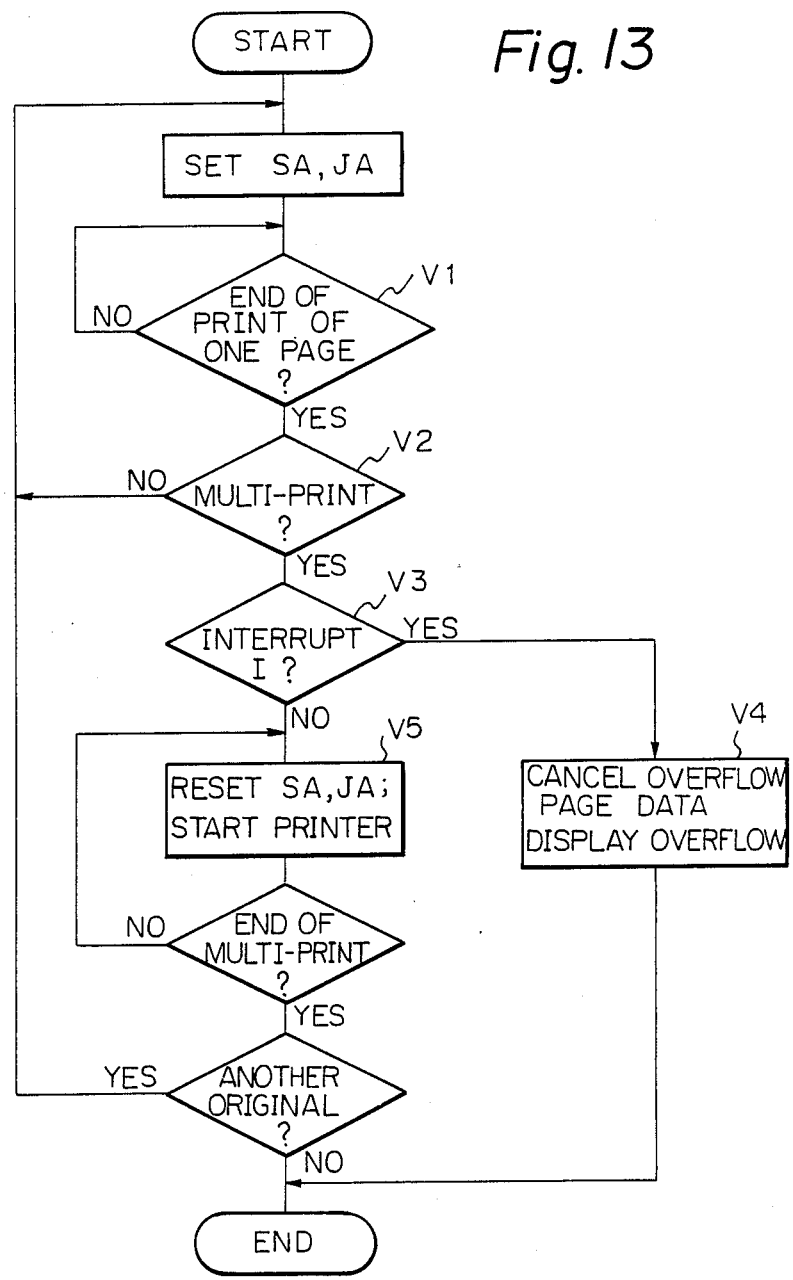
FIG. 13 is a flow chart for explaining multiprinting by the immediate memory area.

In this case, as shown in FIG. 13, when the code is written in the immediate memory area B and the current distance reaches the safety distance L (or the EOP is detected), the memory is read accessed and the printer 200 is started. The printer 200 prints one-page reception data or information on one copy (V1). When a second copy is to be produced of the same original (V2), the printer 200 checks the presence or absence of the interrupt signal I (V3). If the interrupt signal I is detected, the overflow display is performed. At the same time, the second page reading and printing of the same original is interrupted (V4). Therefore, first page printing can be guaranteed, and incomplete second or subsequent page printing is prevented. However, if the interrupt signal I is not detected, the read addresses SA and JA are set again, and second page reading and printing are performed (V5).

In the copy mode set by the copy key, in step V1 of FIG. 13, the memory write rate is almost equal to the memory read rate, and the data read is delayed from the data write by a few lines.

FIG. 14 shows the memory control operation when the data is sent from the immediate memory area B onto the DOX line 400, and FIG. 12 illustrates the memory read/write operation therefor. The image reader 100 is controlled to prevent data errors and interruption of the data read operation of the memory. In the same manner as in the receive mode, the start address SA is set to the start page, and the jump address JA is set to 255. The reader 100 is then started. The memory management circuit 11 is controlled to start writing of the intermediate code data in the memory 10. At the same time, the data is read out from the memory 10 and encoded by the coder 23. Data sending is started under the control of the CCU 30(W1). The CPU 50 checks a distance N representing that the current memory read position (address) is close to the current memory write position (address). When the distance N reaches an overrun distance OV (W3) during reader operation (W2), the reader unit 100 is temporarily interrupted (W4), even if one-page writing is not completed. The pseudo-EOP' is written in the memory 10, and a send continuation flag CT is set in the RAM 52 (W5). Memory writing is thus interrupted, but memory reading continues. Unless the EOP is now read out from the memory 10, sending continues. The CPU 50 checks the distance M representing that the memory write address is close to the read address (W6). If the distance M reaches the safety distance L, the reader 100 is restarted, thereby restarting the memory write operation (W7). In this case, the data is continuously read out from the memory 10. When the data read out from the memory 10 includes the EOP, the CPU 50 checks if the EOP is set after data reading is completed (W8). If the flag CT is not set (W9), the EOP is regarded as a true EOP, and data EOP representing the end of one page is sent. When a succeeding page is present, the reader unit 100 continues original reading. However, if the EOP is the pseudo-EOP', it is disregarded and is not sent (W11). In this case, the memory read and write operations continue. If the reader unit 100 is in operation, its operation also continues. When the CPU 50 determines that no subsequent page of the original to be read is present in the reader unit 100 (W10), the reader unit 100 is stopped. In this way, the reader unit 100 need not be stopped for each line. At the same time, the read access of the memory 10 need not be stopped. The read and write operations of the memory 10 can be simultaneously performed at the bit rate of the transmission line, thus effectively utilizing the transmission line.

The above description is suitable for a terminal-to-terminal network using memories.

Additionally, FIG. 8 corresponds to steps 52 and 53 of FIG. 5; FIG. 10 corresponds to steps 62 to 63; FIG. 13 corresponds to steps 20 to 23 and steps 31 to 37; and FIG. 14 corresponds to steps 43 and 44. Decision branches in FIG. 10 may be executed by program interruption for transmission and reception of one line of data of by timer interruption.

The above-mentioned embodiment is suitable for use as a data processing terminal device which can use memory efficiently.

What is claimed is:

1. A fascimile apparatus comprising:
   means for receiving transmitted data;
   a memory for storing page data corresponding to a plurality of received data;
   means for printing information corresponding to the page data in units of pages; and
   means for controlling read and write access of said memory,
   said control means being adapted to start reading of one page for page printing by said print means, prior to completion of storage of the plurality of pages in said memory, and adapted to allow write access of said memory while said printing means is being operated.

2. A fascimile apparatus comprising:
   means for receiving transmitted data;
   a memory for storing page data corresponding to a plurality of received data;
   means for controlling read and write access of said memory; and
   means for printing information corresponding to the data stored in said memory,
   said control means being adapted to start reading of one page out of said memory when an amount of data written in said memory reaches a predetermined value, and adapted to allow write access of said memory while said printing means is being operated.

3. A facsimile apparatus comprising:
   means for receiving transmitted data;
   memory means for storing data corresponding to at least one of received data and original image data;
   means for generating one of data for printing and data for transmission; and
   means for controlling read and write access of said memory means for data storage or data generation,
   said memory means including a first memory area for storing data and read-accessible after completion of storage of a plurality of pages and a second memory area for storing data and read-accessible during storage of a plurality of pages.

4. A facsimile apparatus comprising:
   means for receiving image data from a digital data transmission line;
   means for decoding received image data;
   a memory for storing data decoded by said decoding means, said memory storing at least one page of data;
   means for printing information corresponding to the data from said memory in unit of pages; and
   means for controlling read and write access of said memory for page printing by said print means, said control means being adapted to allow write access of said memory while said printing means is being operated.

5. An image processing apparatus comprising:
   a memory for storing data corresponding to image data;
   means for printing information corresponding to the data in units of pages; and
   means for controlling read and write access of said memory,
   said control means being adapted to start reading of one page for page printing by said printing means, prior to completion of data storage in said memory, and adapted to allow write access of said memory while said printing means is being operated.

6. An image processing apparatus comprising:
   a memory for storing data of at least one page corresponding to image data; and
   means for controlling read and write access of said memory,
   said control means being adapted to perform read and write access of said memory to allow input of data exceeding a capacity of said memory and to interrupt reading of dat from said memory before completion of read-out of one page in dependence on a state of said memory.

7. An image processing apparatus comprising:
   a memory for storing data corresponding to at least one page of image data;
   means for controlling read and write access of said memory; and
   means for printing information corresponding to the image data stored in said memory,
   said control means being adapted to start reading of one page out of said memory when an amount of data written in said memory reaches a predetermined value, and adapted to allow write access of said memory while said printing means is being operated.

8. An image process apparatus comprising:
memory means for storing data corresponding to image data;
means for generating one of data for printing and data for transmission; and
means for controlling read and write access of said memory means for the data storage or data generations,
said memory means including a first memory area for storing data and read-accessible after storage of predetermined quantity of data and a second memory area for storing data and read-accessible during storage of the predetermined quantity of data.

9. An image processing apparatus comprising:
means for receiving image code data from a digital data line;
means for decoding received image code data;
a memory for storing data decoded by said decoding means, said memory storing at least one page of data;
means for printing information corresponding to the data from said memory in units of pages; and
means for controlling read and write access of said memory for page printing by said print means, said control means being adapted to allow write access of said memory while said printing means is being operated.

* * * * *

UNITED STATES PATENT AND TRADEMARK OFFICE
CERTIFICATE OF CORRECTION

PATENT NO. : 4,774,590
DATED : September 27, 1988
INVENTOR(S) : TOMOYUKI HAGANUMA, ET AL.   Page 1 of 2

It is certified that error appears in the above-identified patent and that said Letters Patent is hereby corrected as shown below:

COLUMN 2

Line 52, "dialling" should read --dialing--.

COLUMN 3

Line 7, "trnasfer" should read --transfer--.

COLUMN 4

Line 36, "stored" should read --store--.
Line 50, "determined" should read --determines--.
Line 63, "determined" should read --determines--.

COLUMN 6

Line 8, "in all" should read --completely--.
Line 16, "on," should read --on.--.
Line 21, "page 199" should read --page 191--.

COLUMN 7

Line 64, "of" should read --Of--.

COLUMN 8

Line 27, "he" should read --the--.
Line 57, "DOX line 400," should read --DDX line 400,--.

UNITED STATES PATENT AND TRADEMARK OFFICE
CERTIFICATE OF CORRECTION

PATENT NO. : 4,774,590
DATED : September 27, 1988
INVENTOR(S) : TOMOYUKI HAGANUMA, ET AL.   Page 2 of 2

It is certified that error appears in the above-identified patent and that said Letters Patent is hereby corrected as shown below:

COLUMN 9

Line 44, "of" should read --or--.
Line 49, "fascimile" should read --facsimile--.
Line 63, "fascimile" should read --facsimile--.

COLUMN 10

Line 29, "unit" should read --units--.
Line 55, "dat" should read --data--.

COLUMN 11

Line 3, "process" should read --processing--.

Signed and Sealed this

Twenty-fifth Day of April, 1989

*Attest:*

DONALD J. QUIGG

*Attesting Officer*   *Commissioner of Patents and Trademarks*